United States Patent

[11] 3,529,536

[72] Inventor Richard J. Milhem
1732 Brys Drive, Grosse Pointe Woods, Michigan 48236
[21] Appl. No. 683,697
[22] Filed Nov. 16, 1967
[45] Patented Sept. 22, 1970

[54] BASTING BARREL
23 Claims, 8 Drawing Figs.
[52] U.S. Cl. ............................................... 99/346, 99/421, 99/444
[51] Int. Cl. ............................................... Aj47 37/10
[50] Field of Search ............................................... 99/345, 346, 421, 444, 443, 447, 446, 427, 426, 341

[56] References Cited
UNITED STATES PATENTS

| | | | |
|---|---|---|---|
| 200,622 | 2/1878 | McConnell | 99/444 |
| 426,712 | 4/1890 | Carpenter | 99/346 |
| 602,317 | 4/1898 | Fox | 99/346 |
| 1,159,078 | 11/1915 | Overpack | 99/426 |
| 1,292,031 | 1/1919 | Parker | 99/345 |
| 1,394,412 | 10/1921 | Greenick | 99/421 |
| 2,622,186 | 12/1952 | Hutchens | 99/444X |
| 2,705,450 | 4/1955 | Steinbook | 99/427X |
| 2,722,172 | 11/1955 | Garbo | 99/346 |
| 2,882,812 | 4/1959 | Greenwald | 99/427 |
| 3,211,082 | 10/1965 | Sachnoff et al. | 99/444 |

Primary Examiner—Billy J. Wilhite
Attorney—Irving M. Weiner

ABSTRACT: A basting and/or tumbling barrel for cooking food. The rotatable barrel has elongated internal basting or tumbling ribs which cyclically raise and baste liquids onto the food. The barrel has a plurality of apertures which are surrounded, at least partly, on the inner surface of the barrel with a ridge or embossment.

Patented Sept. 22, 1970

3,529,536

INVENTOR.
RICHARD J. MILHEM
BY Irving M. Weiner
ATTORNEY

Patented Sept. 22, 1970

INVENTOR.
RICHARD J. MILHEM

BY *Irving M. Weiner*

ATTORNEY

Patented Sept. 22, 1970  3,529,536

INVENTOR.
RICHARD J. MILHEM

BY *Irving M. Weiner*

ATTORNEY 3,529,536

1

BASTING BARREL

BACKGROUND OF THE INVENTION

1. Field of the Invention

The present invention pertains to the field of art encompassing rotary cooking apparatus, especially those which attempt to automatically baste or tumble the food being cooked. The present invention may be used as a rotisserie attachment for indoor or outdoor cooking devices.

2. Description of the Prior Art

There are prior types of rotisserie attachments, such as those which include a drip baster box affixed to a wire mesh basket that holds the food for cooking. No prior art device is capable of doing what the present invention can do, viz., to baste foods in their natural juices, to protect the food from contamination with ashes, to protect the food from catching fire, and to eliminate fat or grease fires or flare-ups.

SUMMARY OF THE INVENTION

The present invention provides a cooking apparatus including a rotatable hollow body within which the food to be cooked may be disposed. Means are provided for rotating the hollow body within a heated environment generated by an adjacent source of heat. The hollow body has at least one basting member on its inner surface, such basting member extending substantially parallel to the axis of rotation of the hollow body. The hollow body has at least one aperture therein to facilitate the passage of heat from the source of heat to the food in the hollow body.

The basting or tumbling barrel may be of cylindrical shape with dimpled apertures, or perforated concave holes, or ridge-surrounded apertures.

The invention may be used in conjunction with means for rotating the rotatable hollow body relative to a source of heat. Each aperture in the hollow body or barrel may have a ridge or embossment surrounding partially or completely its associated aperture on the inside surface of the hollow body to obstruct or impede the leakage through the aperture of liquids from inside the hollow body to the outside thereof.

The cooking apparatus of the present invention is easily attached to most standard spits for rotation therewith. Built into the apparatus are substantially horizontal dams or basting members which are arranged parallel to the central spit, and which serve as a catch basin for the juices or basting sauce. During rotation these basting dams pour the juices back upon the food being cooked. The concave nature or embossment feature of the perforations or apertures prevents the juices from spilling on the coals or other source of heat and thereby eliminates undesired flames. By having the food substantially enclosed, the apparatus also prevents ashes from being blown on the food.

The invention also provides a cooking apparatus for attachment to a rotatable spit of an indoor or outdoor barbecue, and includes a hollow substantially cylindrical metal barrel having a plurality of apertures therethrough and a plurality of internal basting rib members. Each aperture has a predetermined embossment substantially surrounding the aperture on the internal surface of the barrel to impede leakage of liquids in the barrel through the aperture. The barrel encloses the food to be cooked and is connected to the spit to rotate in unison therewith. The basting ribs are disposed in a predetermined arrangement, and each has a predetermined shape to facilitate the basting of the food with liquids continuously and automatically as the spit and barrel rotate.

Each aperture may lie in a depression or concavity on the outer surface of the barrel, which exists as a boss or convexity on the inner surface of the barrel.

BRIEF DESCRIPTION OF THE DRAWINGS

Only two of the many possible embodiments of the invention are illustrated in the accompanying drawings, wherein like numerals refer to like parts throughout.

2

Figure 1:
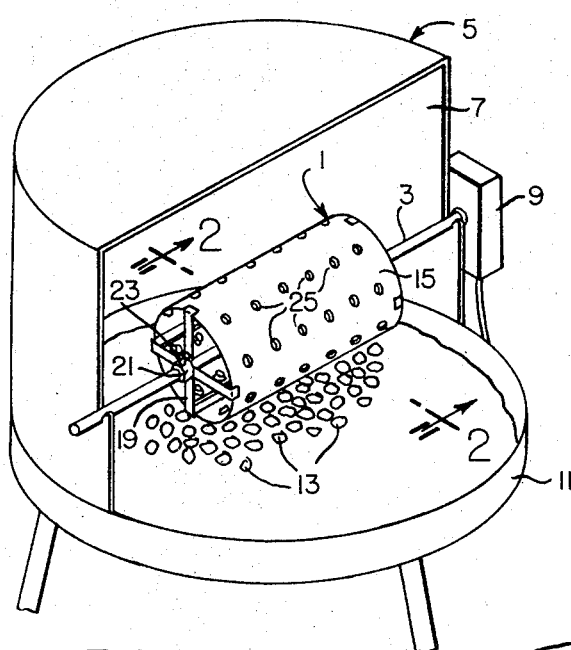

FIG. 1 is a perspective view of a first embodiment of the invention showing an open-ended basting barrel secured to a rotary spit of a barbecue.

Figure 2:
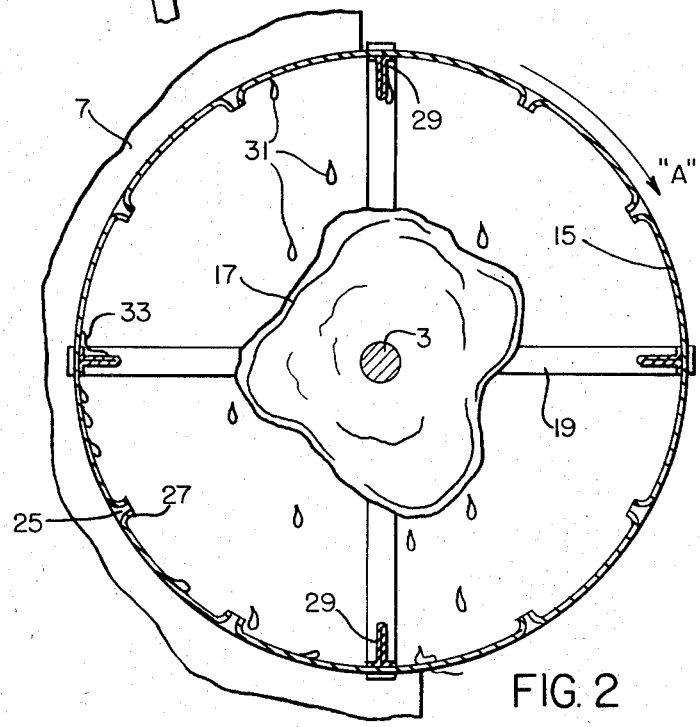

FIG. 2 is an enlarged vertical cross-section of the basting barrel taken along the line 2—2 of FIG. 1.

Figure 3:
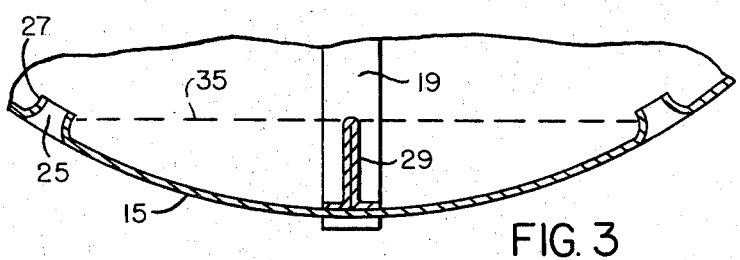

FIG. 3 is a further enlarged fragment of the cross-section shown in FIG. 2 illustrating the relative dimensions and arrangement of the basting or tumbling member and the ridge-surrounded apertures.

Figure 4:
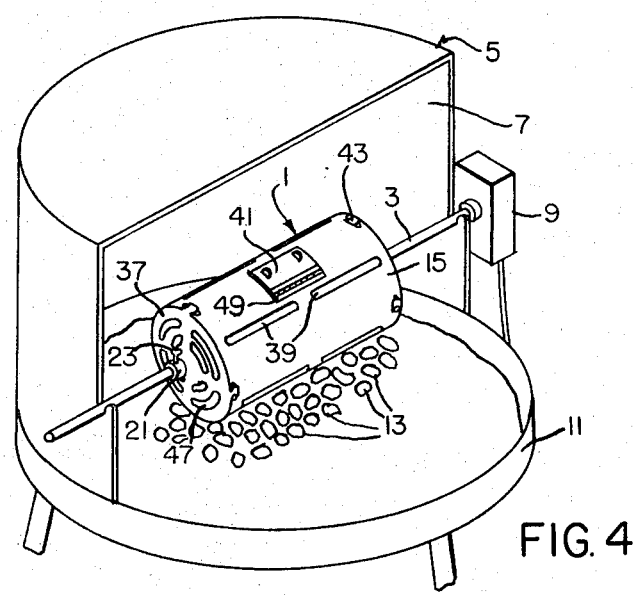

FIG. 4 is a perspective view of a second embodiment of the invention showing a basting barrel with end covers secured to a rotary spit of a barbecue.

Figure 5:
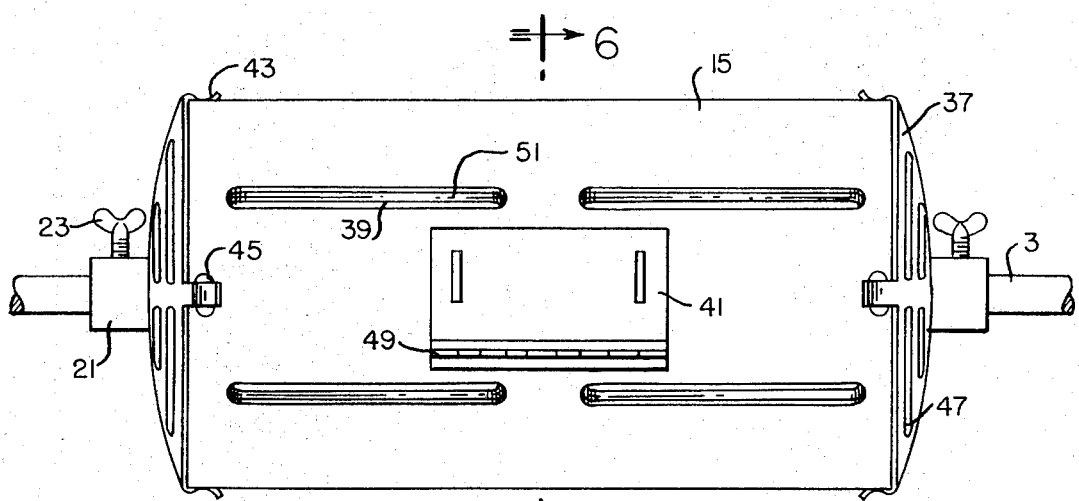

FIG. 5 is an enlarged top view of the basting barrel shown in FIG. 4.

Figure 6:
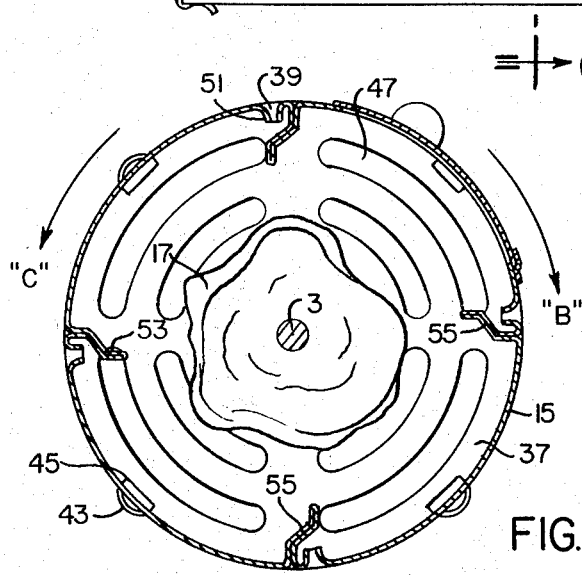

FIG. 6 is a further enlarged cross-section taken along the line 6—6 of FIG. 5.

Figure 7:
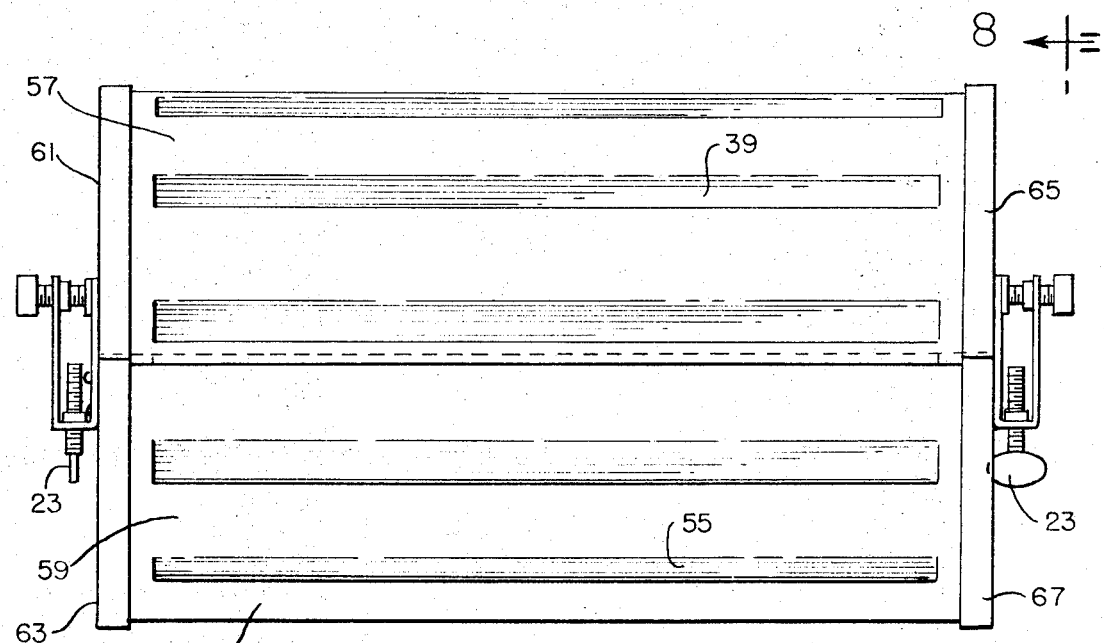

FIG. 7 is a front elevational view of a third embodiment of the invention showing a basting barrel made up of two semi-cylindrical sections.

Figure 8:
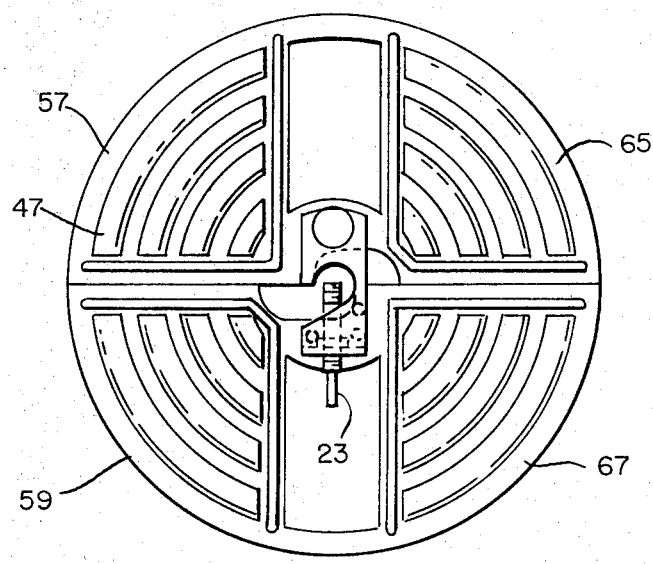

FIG. 8 is a side view taken along the line 8—8 of FIG. 7.

DETAILED DESCRIPTION

A first embodiment of the invention is shown in FIGS. 1, 2 and 3. FIG. 1 shows the novel cooking apparatus 1 mounted on a rotary spit 3 of a conventional barbecue 5. The barbecue 5 includes a hood 7, a spit 3, a motor 9 for rotating the spit 3, and a base 11 for holding glowing charcoals 13 which serve as the source of heat.

The cooking apparatus 1 includes a hollow body, such as a cylindrical barrel 15, in which the food to be cooked is placed. If, for example, some meat 17 is to be barbecued or roasted, then the meat 17 may be secured to the spit 3 by conventional means not shown.

The basting or tumbling barrel 15 may be open-ended, and may be provided at each end with struts 19 connecting the barrel 15 to an associated hub member 21. Each hub member 21 may be removably secured to the spit 3 by set screws 23 having winged end portions to facilitate manual rotation thereof.

As shown in FIG. 1, the barrel 15 may be provided with a plurality of apertures 25 which may be of any suitable shape and cross-section that permits heat and smoke to pass therethrough into the interior of the barrel 15, while impeding the leaking out of liquids through the apertures 25. A ridge or embossment 27 may be provided partly or entirely surrounding the aperture 25 on the interior surface of the barrel 15. The cross-sectional views of FIGS. 2 and 3 illustrate truncated, substantially conical shaped apertures 25 and embossments 27, but various other shapes are also suitable.

Affixed to or integral with the interior surface of the barrel 15 are one or more basting or tumbling members 29 which may extend the length of the barrel 15 substantially parallel to the spit 3. As the barrel 15 rotates in unison with the rotating spit 3, the basting members 29 cyclically raise the accumulated liquids, such as meat juices or basting sauce, which drip down upon the food 17 being cooked as each basting member 29 reaches an elevated position. In FIG. 2, the barrel 15 is rotating in the direction indicated by the arrow A, and an exemplary resulting motion pattern of the liquid is indicated by the droplets 31. The accumulated liquid 33 may be seen being carried upward by a basting member 29 as the basting member 29 reaches an upper quadrant in its cycle.

Even if the liquid 33 drips off the basting member 29 and onto only a portion of the meat 17 being cooked before that basting member 29 attains its highest position, this does not mean that the other portions of the meat 17 will be left unbasted. This is so because the meat 17 is also rotating in unison with the spit 3, and consequently each of the plurality of basting members 29 will baste different portions of the meat 17. Also, the liquid basted onto the meat 17 at one location tends to leak around to other locations of the meat 17 under the influence of gravity, the rotational speed of the meat 17, and the shape of the meat 17. Precisely when the basting liquid starts to leak off the basting member 29, when most of the liquid leaves the basting member 29, and when the liquid ceases to leak off the basting member 29 all depend on many factors, including the viscosity of the liquid, the instantaneous rotational and linear velocity of the basting member 29, the shape of the basting member 29, the coefficient of friction between the liquid and the basting member 29, the instantaneous elevation and orientation of the basting member 29, the weight of the liquid, etc.

FIG. 3 shows an enlarged section of FIG. 2, wherein the line 35 indicates substantially the theoretical instantaneous highest possible level of accumulated liquid. Such theoretical highest level 35 depends on the height of the basting member 29, the radius of curvature of the barrel 15, the distance between the basting member 29 and the aperture 25 closest thereto, how closely barrel 15 is aligned parallel to the true horizontal, the viscosity of the liquid, the instantaneous rotational and linear velocity of the barrel 15, the coefficient of friction between the liquid and the inner surface of the barrel 15, the weight of the liquid, the distance the source of liquid (e.g., the meat 17) is positioned relative to the ends of barrel 15, and how rapidly the liquid accumulates. The height and shape of the ridge or embossment 27 surrounding the aperture 25, and the shape of the aperture 25 affect the impeding of the liquids from leaking out of the barrel 15, and may also affect the theoretical highest possible level 35 of accumulated liquid.

FIGS. 4, 5 and 6 illustrate a second possible embodiment of the invention which includes special end covers 37, elongated slitted apertures 39, and a hinged viewing door 41. FIG. 4 shows the novel cooking apparatus 1 mounted on a conventional barbecue spit 3 as in FIG. 1.

The end covers 37 have clips 43 which mate with dimpled or cut-out portions 45 of the barrel 15. The end covers 37 can thus be firmly held connected to the barrel 15, and may be easily removed and re-assembled for cleaning, mounting or assembling purposes. The end covers 37 may be optionally provided with ventilating or viewing slits 47. If desired, one cover 37 may be permanently secured to the spit 3.

FIGS. 4 and 5 show a viewing door 41 connected by a hinge 49 to the barrel 15. Periodic opening of the door 41 permits viewing the cooking progress of the food 17 being cooked.

In this embodiment, the apertures 39 are elongated slits surrounded, at least partially, on the inner surface of the barrel 15 with a suitable ridge or embossment 51. The basting members 53 have a predetermined special shape, orientation and position relative to the slitted apertures 39 to prevent liquid droplets from falling directly out through the apertures 39 and to facilitate elevating the basting liquid. The curved or S shaped basting members 53 are shown in cross-section in FIG. 6, wherein an angled or curved medial portion 55 of each basting member 53 covers the opening of its associated elongated apertures 39.

Similar to the first embodiment shown in FIGS. 1, 2 and 3, the second embodiment may be rotated in either clockwise or counterclockwise direction with excellent results. When the barrel 15 is rotated in the direction of arrow B as shown in FIG. 6, each basting member 53 can raise a considerable quantity of liquid, but the liquid starts to drip off the basting member 53 a substantial distance before that basting member 53 reaches its zenith. When the barrel 15 is rotated in the direction of arrow C, the quantity of accumulated liquid is limited by the height of the ridge 51 and the close proximity of the aperture 39 to the basting member 53, but the liquid starts to baste onto the meat 17 at a point much closer the zenith of the basting member 53 which tends to give more uniform and thorough basting.

In another possible embodiment, the aforementioned third embodiment shown in FIGS. 7 and 8, the barrel 15 may consist of two semi-cylindrical sections 57 and 59, one of which, for example, section 59, may be permanently affixed to the spit 3 by, for example, set screws 23. These sections 57 and 59 may be fabricated from aluminum castings. This two-section embodiment facilitates easy cleaning of all parts. The end covers may be half-moon permanently affixed end plates 61, 63, 65 and 67.

In all embodiments, the food to be cooked may either be secured on the spit 3 or be placed loose in the barrel 15 for tumbling. The tumbling action is aided by the basting or tumbling members 27 or 53 which perform the dual functions of basting and tumbling. Tumbling is particularly suitable for cooking certain types of food, such as chicken in parts or potatoes.

I claim:

1. Cooking apparatus comprising, in combination:
a rotatable hollow body within which food to be cooked may be disposed;
means for supporting a source of heat;
means for rotating said rotatable hollow body relative to said source of heat and in heat receiving relation thereto;
said rotatable hollow body being provided with at least one basting member on the inner surface of said rotatable hollow body, which basting member extends substantially parallel to the axis of rotation of said rotatable hollow body;
said rotatable hollow body being provided with at least one aperture therein to facilitate the passage of heat from said source of heat to said food disposed within said rotatable hollow body; and
each said aperture provided in said rotatable hollow body having a ridge surrounding at least a portion of its associated aperture on the inside surface of said rotatable hollow body to obstruct the leakage through said aperture of liquids from inside said rotatable hollow body to the outside thereof.

2. Apparatus according to claim 1, wherein:
said rotatable hollow body comprises a substantially cylindrical metal barrel removably secured to a rotary spit; and including:
a plurality of said basting members equally spaced apart on the inner surface of said barrel; and
a plurality of said apertures equally spaced apart in said barrel.

3. Apparatus according to claim 1, wherein each said aperture comprises an elongated slit.

4. Apparatus according to claim 1, wherein each said aperture has a substantially circular cross-section.

5. Apparatus according to claim 1, wherein each said basting member is substantially flat and lies substantially within a radial plane of said rotatable hollow body.

6. Cooking apparatus comprising, in combination:
a rotatable hollow body within which food to be cooked may be disposed;
means for supporting a source of heat;
means for rotating said rotatable hollow body relative to said source of heat and in heat receiving relation thereto;
said rotatable hollow body being provided with at least one basting member on the inner surface of said rotatable hollow body, which basting member extends substantially parallel to the axis of rotation of said rotatable hollow body;
said rotatable hollow body being provided with at least one aperture therein to facilitate the passage of heat from said source of heat to said food disposed within said rotatable hollow body;
each said aperture provided in said rotatable hollow body having a ridge surrounding at least a portion of its associated aperture on the inside surface of said rotatable hollow body to obstruct the leakage through said aperture of liquids from inside said rotatable hollow body to the outside thereof; and
each said basting member having a predetermined curved shape including a portion thereof disposed between its associated aperture and said axis of rotation of said rotatable hollow body to prevent liquids from dropping directly out of said rotatable hollow body through said associated aperture.

7. Apparatus according to claim 1, wherein said rotatable hollow body is substantially open-ended, and is provided with struts connecting said rotatable hollow body to a rotary spit.

8. Apparatus according to claim 1, including:
a pair of end covers which are adapted to be removably secured to the ends of said rotatable hollow body; and
a hinged viewing door in the surface of said rotatable hollow body to enable viewing the progress of cooking.

9. Apparatus according to claim 1, wherein said rotatable hollow body comprises two substantially semi-cylindrical sections, at least one of which is adapted to be connected to a rotary spit, and including permanently affixed substantially half-moon shaped end plates.

10. Cooking apparatus for attachment to a rotatable spit of a barbecue, comprising in combination:
a hollow substantially cylindrical metal barrel having a plurality of apertures therethrough and a plurality of internal basting rib members;
each of said plurality of apertures having a predetermined embossment substantially surrounding its associated aperture on the internal surface of said barrel to impede leakage of liquids in the barrel through said apertures;
said barrel enclosing the food to be cooked and being connected to said rotatable spit to rotate in unison therewith; and
said plurality of internal basting rib members being disposed in a predetermined arrangement and each having a predetermined shape to baste said food to be cooked with liquids continuously and automatically as said rotatable spit and barrel rotate.

11. Apparatus according to claim 10, wherein:
said hollow substantially cylindrical metal barrel is removably secured to said rotatable spit;
said plurality of said basting members are equally spaced apart on the inner surface of said barrel; and
said plurality of said apertures are equally spaced apart in said barrel.

12. Apparatus according to claim 10, wherein each said aperture comprises an elongated slit.

13. Apparatus according to claim 10, wherein each said aperture has a substantially circular cross-section.

14. Apparatus according to claim 10, wherein each said basting member is substantially flat and lies substantially within a radial plane of said barrel.

15. Cooking apparatus for attachment to a rotatable spit of a barbecue, comprising, in combination:
a hollow substantially cylindrical metal barrel having a plurality of apertures therethrough and a plurality of internal basting rib members;
each of said plurality of apertures having a predetermined embossment substantially surrounding its associated aperture on the internal surface of said barrel to impede leakage of liquids in the barrel through said apertures;
said barrel enclosing the food to be cooked and being connected to said rotatable spit to rotate in unison therewith;
said plurality of internal basting rib members being disposed in a predetermined arrangement and each having a predetermined shape to baste said food to be cooked with liquids continuously and automatically as said rotatable spit and barrel rotate; and
each said basting member having a predetermined curved shape including a portion thereof disposed between its associated aperture and the axis of rotation of said barrel to prevent liquids from dropping directly out of said barrel through said associated aperture.

16. Apparatus according to claim 10, wherein said barrel is substantially open-ended, and has struts connecting said barrel to said rotatable spit.

17. Apparatus according to claim 10, including:
a pair of end covers which are adapted to be removably secured to the ends of said barrel; and
a hinged viewing door in the surface of said barrel to enable viewing the progress of the cooking operation.

18. Apparatus according to claim 10, wherein said barrel comprises two substantially semi-cylindrical sections, at least one of which is adapted to be directly secured to said rotatable spit, and including permanently affixed substantially half-moon shaped end plates.

19. Cooking apparatus comprising, in combination:
a rotatable hollow body within which the food to be cooked may be disposed;
means for rotating said rotatable hollow body within a heated environment produced by a source of heat;
said rotatable hollow body being provided with at least one basting member of the inner surface of said rotatable hollow body, which basting member extends substantially parallel to the axis of rotation of said rotatable hollow body;
said rotatable hollow body being provided with at least one aperture therein to facilitate the passage of heat from said heated environment or said source of heat for said unit disposed within said rotatable hollow body; and
each said basting member having a predetermined curved shape including a portion thereof disposed between an associated aperture and said axis of rotation of said hollow body to prevent liquids within said hollow body from dropping directly out through said associated aperture.

20. Cooking apparatus comprising, in combination:
a rotatable hollow body within which the food to be cooked may be disposed;
means for rotating said rotatable hollow body within a heated environment produced by a source of heat;
said rotatable hollow body comprises a substantially cylindrical metal barrel removably secured to a rotary spit;
said rotatable hollow body being provided with a plurality of basting members equally spaced apart on the inner surface of said barrel, each basting member extending substantially parallel to the axis of rotation of said rotatable hollow body; and
said rotatable hollow body being provided with a plurality of apertures equally spaced apart in said barrel to facilitate the passage of heat from said heated environment to said food disposed within said rotatable hollow body.

21. Cooking apparatus comprising, in combination:
means for supporting a source of heat;
a rotatable hollow body within which food to be cooked may be disposed;
means for rotating said rotatable hollow body relative to said source of heat and in heat receiving relation thereto;
said rotatable hollow body being provided with at least one basting member on the inner surface of said rotatable hollow body;
said rotatable hollow body being provided with at least one aperture therein to facilitate the passage of heat from said source of heat to said food disposed within said rotatable hollow body;
each said aperture having a ridge surrounding at least a portion of its associated aperture on said inner surface of said rotatable hollow body and being so positioned as to obstruct the leakage through said aperture of liquids from inside said hollow body to the outside thereof;
said means for rotating said rotatable hollow body including a rotatable central shaft; and
said hollow body including two substantially semi-cylindrical sections at least one of which is adapted to be removably connected to said central shaft.

22. Apparatus according to claim 21, including set screws connected to at least one of said substantially semi-cylindrical sections for facilitating removable connection of said section to said central shaft, said set screws having winged end portions to facilitate manual rotation thereof.

23 Apparatus according to claim 21, wherein at least one of said substantially semi-cylindrical sections has affixed thereto an end plate, and said end plate has affixed thereto a device for coupling said semi-cylindrical section to said rotatable central shaft.